A. L. SWEET.
Automatic Clamp-Hooks for Suspending Brooms.
No. 149,807. Patented April 14, 1874.
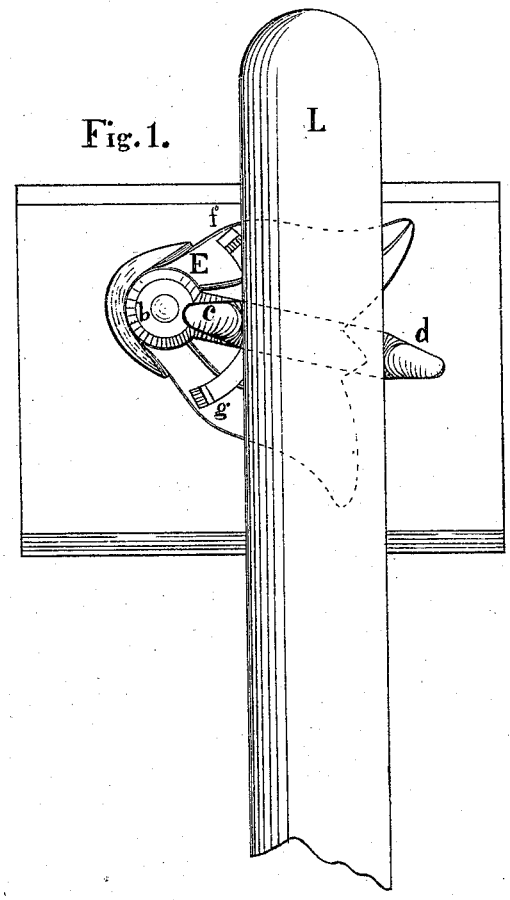
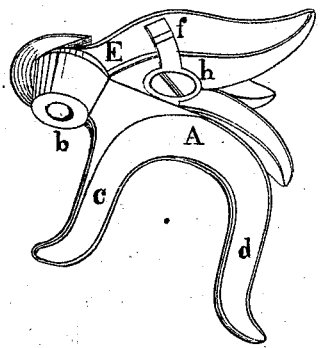
WITNESSES.
Allen Tenny
Byron Boardman
INVENTOR.
Alonzo L. Sweet

UNITED STATES PATENT OFFICE.

ALONZO L. SWEET, OF NORWICH, CONNECTICUT, ASSIGNOR TO HIMSELF AND CHARLES J. WINTERS, OF SAME PLACE.

IMPROVEMENT IN AUTOMATIC CLAMP-HOOKS FOR SUSPENDING BROOMS.

Specification forming part of Letters Patent No. 149,807, dated April 14, 1874; application filed February 16, 1874.

*To all whom it may concern:*

Be it known that I, ALONZO LOUIS SWEET, of Norwich, State of Connecticut, have invented an Automatic Clamp-Hook, of which the following is a specification:

The nature of my invention consists of a device for suspending a broom, brush, hay-fork, or other utensil, by means of a vibrating hook so arranged as to automatically clamp or gripe the handle of the implement in such a manner as to securely hold the same in suspension.

The following is a clear and exact description of the construction and operation of the same, reference being had to the accompanying drawings making a part of this specification, in which—

Figure 1 shows the device affixed to the wall of a building with a section of a broom-handle represented in position to be griped and held by the same. Fig. 2 is a perspective view of the device complete.

A represents a vibrating hook pivoted at $b'$, and constructed with projecting arms or jaws $c'$ and $d'$, for the purpose of embracing and clamping the object to be suspended. E is a base-plate, to which hook A is pivoted. $f$ and $g$ are studs or stops, for the purpose of confining the motion of hook A within proper limits. The lower stud, $g$, is for supporting said hook in position for use, while the upper stop, $f$, prevents the same from becoming displaced by vibrating past a perpendicular position and falling upon the opposite side of the pivot. $h$ is a screw passing through base-plate E, for the purpose of securing the device in a convenient position upon a post or the wall of a building. L represents a section of a broom-handle clamped and sustained by the arms of hook A. The vibrating hook A and base-plate E, together with the studs or stops $f'$ and $g'$, are so constructed and arranged in relation to each other as to be reversible; that is equally adapted for use when the device is affixed to the wall with hook A projecting either to the right, as shown in the drawings, or to the left, as might prove most convenient for a given location.

The operation is as follows: The device being properly affixed to the wall of a building, hook A will incline downward by force of gravity, and rest upon the lower stud, $g$, where it is supported and retained in a convenient position, to readily receive the object to be suspended, as shown in Fig. 2. The handle L of a broom or other implement is introduced between the arms or jaws $c$ and $d$ by a slight upward motion, which action elevates hook A in a sufficient degree to afford a free entrance of the handle. The tendency of hook A to fall or swing upon its pivot $b$, will cause jaws $c'$ and $d'$ to press upon opposite sides of the handle; and when said implement is allowed to rest fully upon the device, the tendency of said hook to fall will be correspondingly increased by the extra weight applied, and consequently the side pressure of said jaws upon the handle will be increased in such a degree as to securely hold the same in suspension, as shown in Fig. 1, while said hook and implement are free to swing or vibrate upon pivot $b$ without injury, should motion be communicated to them accidentally or otherwise. By giving the suspended implement a slight upward motion, it is unclamped and may be easily removed.

Having thus fully described my invention, what I claim as new, and desire to secure by Letters Patent, is—

The reversible base-plate E, provided with studs or stops $f$ and $g$, in combination with hook A, as and for the purpose specified.

ALONZO L. SWEET.

Witnesses:
ALLEN TENNY,
BYRON BOARDMAN.